(12) United States Patent
Urushihara et al.

(10) Patent No.: US 11,581,127 B2
(45) Date of Patent: Feb. 14, 2023

(54) INSULATED ELECTRIC WIRE, PRODUCTION METHOD THEREFOR, COIL AND COIL PRODUCTION METHOD USING SAME

(71) Applicant: MITSUBISHI MATERIALS CORPORATION, Tokyo (JP)

(72) Inventors: Makoto Urushihara, Amagasaki (JP); Yasuhiko Kudo, Amagasaki (JP); Shintaro Iida, Amagasaki (JP); Hideaki Sakurai, Amagasaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 623 days.

(21) Appl. No.: 16/493,801

(22) PCT Filed: Feb. 21, 2018

(86) PCT No.: PCT/JP2018/006268
§ 371 (c)(1),
(2) Date: Sep. 13, 2019

(87) PCT Pub. No.: WO2018/173608
PCT Pub. Date: Sep. 27, 2018

(65) Prior Publication Data
US 2020/0035407 A1 Jan. 30, 2020

(30) Foreign Application Priority Data

Mar. 22, 2017 (JP) .............................. JP2017-055389

(51) Int. Cl.
*H01F 27/32* (2006.01)
*C09D 179/08* (2006.01)
(Continued)

(52) U.S. Cl.
CPC ............... *H01F 27/32* (2013.01); *C09D 5/44* (2013.01); *C09D 179/08* (2013.01); *H01B 7/02* (2013.01); *H01F 5/06* (2013.01); *H01F 41/066* (2016.01)

(58) Field of Classification Search
CPC ...................................... H01F 41/12
See application file for complete search history.

(56) References Cited

U.S. PATENT DOCUMENTS 3,543,205 A * 11/1970 Van Nice .............. H01F 27/343
336/70
4,159,920 A * 7/1979 Andersson ............. H01B 13/10
156/201

(Continued)

FOREIGN PATENT DOCUMENTS

CN 103843075 A 6/2014
CN 105551583 A 5/2016
(Continued)

OTHER PUBLICATIONS

Supplementary European Search Report dated Oct. 12, 2020, issued for European Patent Application No. 18772228.5.
(Continued)

*Primary Examiner* — Krystal Robinson
(74) *Attorney, Agent, or Firm* — Locke Lord LLP; James E. Armstrong, IV; Nicholas J. DiCeglie, Jr.

(57) ABSTRACT

There is provided an insulated electric wire formed by covering a rectangular conductor wire having a rectangular cross-sectional shape with an insulating film. The insulating film is formed of an inner layer covering a surface of the rectangular conductor wire, and an outer layer covering a surface of the inner layer. A thickness ($t_1$) of a section of the inner layer, which covers one short side of two facing short sides of the same length of a rectangular cross section of the rectangular conductor wire, is greater than a thickness ($t_2$)

(Continued)

(including that $t_2=0$) of a section of the inner layer which covers the other short side. An elastic modulus and/or a yield stress of the inner layer are less than an elastic modulus and/or a yield stress of the outer layer.

12 Claims, 3 Drawing Sheets

(51) Int. Cl.
*H01F 41/066* (2016.01)
*H01F 5/06* (2006.01)
*C09D 5/44* (2006.01)
*H01B 7/02* (2006.01)

(56) References Cited

U.S. PATENT DOCUMENTS

| | | | | |
|---|---|---|---|---|
| 4,447,797 A | * | 5/1984 | Saunders | H01B 3/40 |
| | | | | 174/120 SR |
| 4,552,990 A | * | 11/1985 | Persson | H01F 27/2823 |
| | | | | 174/117 FF |
| 5,591,522 A | * | 1/1997 | Sakai | C09J 7/50 |
| | | | | 428/354 |
| 6,080,935 A | * | 6/2000 | Lanoue | H01F 41/063 |
| | | | | 174/117 FF |
| 9,424,961 B2 | * | 8/2016 | Oya | H01B 7/0009 |
| 9,484,124 B2 | | 11/2016 | Honda et al. | |
| 10,319,491 B2 | * | 6/2019 | Fukuda | H02K 3/30 |
| 10,483,013 B2 | * | 11/2019 | Oya | H01B 3/427 |
| 2008/0164050 A1 | * | 7/2008 | Kamibayashi | H01F 27/323 |
| | | | | 427/118 |
| 2012/0279754 A1 | * | 11/2012 | Rabbia | H02K 3/14 |
| | | | | 174/117 R |
| 2013/0008688 A1 | * | 1/2013 | Nagai | H02K 3/30 |
| | | | | 174/212 |
| 2013/0037304 A1 | * | 2/2013 | Ikeda | H01B 3/306 |
| | | | | 174/110 N |
| 2014/0020929 A1 | * | 1/2014 | Hisada | H01B 3/306 |
| | | | | 174/110 SR |
| 2014/0066314 A1 | * | 3/2014 | Maeda | H01F 6/06 |
| | | | | 174/110 SR |

FOREIGN PATENT DOCUMENTS

| | | | |
|---|---|---|---|
| CN | 106104707 A | | 11/2016 |
| CN | 205900182 U | * | 1/2017 |
| CN | 110415874 A | * | 11/2019 |
| JP | H04-341709 A | | 11/1992 |
| JP | 2003-272916 A | | 9/2003 |
| JP | 2010-108725 A | | 5/2010 |
| JP | 2011-192514 A | | 9/2011 |
| JP | 2012-129120 A | | 7/2012 |
| JP | 2012-228338 A | | 11/2012 |
| JP | 2013-117040 A | | 6/2013 |
| JP | 2016-086077 A | | 5/2016 |
| WO | 2016/103804 A1 | | 6/2016 |

OTHER PUBLICATIONS

Office Action dated Jun. 4, 2021, issued for European Patent Application No. 18772228.5.
International Search Report dated Apr. 17, 2018, issued for PCT/JP2018/006268 and English translation thereof.
Office Action dated Jun. 28, 2020, issued for Chinese Patent Application No. 201880014473.3 and English translation thereof.

* cited by examiner

INSULATED ELECTRIC WIRE, PRODUCTION METHOD THEREFOR, COIL AND COIL PRODUCTION METHOD USING SAME

TECHNICAL FIELD

The present invention relates to an insulated electric wire for winding, which is formed by covering a conductor wire with an insulating film having a two-layer structure, and a production method therefor. More specifically, the present invention relates to an insulated electric wire that exhibits a good adhesion between an insulating film and a conductor wire in a bent inner section when the insulated electric wire is subjected to bending, and a production method therefor. Further more specifically, the present invention relates to a coil production method using an insulated electric wire, and a coil.

Priority is claimed on Japanese Patent Application No. 2017-055389, filed on Mar. 22, 2017, the content of which is incorporated herein by reference.

BACKGROUND ART

In recent years, hybrid vehicles or electric vehicles require a high-performance reactor or a high-performance motor. Accordingly, the type of an insulated electric wire for a coil, which is used in the reactor or motor, is shifted from a round wire with a circular cross-sectional shape to a rectangular wire with a rectangular cross-sectional shape. A coil production process is shifted from flatwise bending to edgewise bending. To obtain a reactor or motor with a higher performance, it is necessary to reduce a bending radius in the edgewise bending. In the edgewise bending, if the bending radius is reduced, a bent inner section of a film is likely to delaminate from a conductor, and the film is twisted, and thus wrinkles occur in the film. Fracturing or cracking occurs in a bent outer section of the film. Such defects cause deterioration in insulation performance which is the most important factor of the insulated electric wire. In order to prevent the occurrence of delamination and wrinkles, it is required to produce a rectangular insulated electric wire having high adhesion, in which a film does not delaminate from a conductor even when the rectangular insulated electric wire is subjected to bending.

Until now, there is proposed an insulated electric wire exhibiting a good adhesion between a conductor and an insulating film, and a production method therefor (for example, refer to Patent Literature 1). The insulated electric wire production method disclosed in Patent Literature 1 is a method for forming a primer layer with a thickness of 4 μm or greater between the conductor and the insulating film by once coating a surface of the conductor with a coating material (containing resin for forming a coated film and polysulfide polymer) of an amount which enables forming the layer with a thickness of 4 μm or greater after curing, and then by heat curing the coated conductor. In the production method, since sulfur atoms of the polysulfide polymer contained in the primer are bonded with the conductor (copper), thereby strengthening the adhesive force, and the polysulfide polymer contained in the primer layer has rubber elasticity, external stress exerted to the insulating film is reduced. As a result, it is possible to increase the delamination strength of the insulating film.

Patent Literatures 2 and 3 propose a magnet wire and the multilayer anionic electrodeposition coated film forming method, respectively, relating to an insulated electric wire formed by covering a conductor wire with an insulating film having a two-layer structure. In the magnet wire disclosed in Patent Literature 2, the insulating film formed around the conductor wire is formed of an inner film disposed around the conductor wire, and an outer film disposed around the inner film, the outer film has a relatively high heat resistance compared to the inner film, and the inner and outer films adhere to each other via engagement portions which are engaged with each other. Since the magnet wire has the insulating film with a two-layer structure, two layers of insulating films are not separated from each other, and exhibit high adhesion to each other. As a result, the magnet wire has good heat radiation, and tearing also is unlikely to occur in the outer film.

The multilayer anionic electrodeposition coated film forming method disclosed in Patent Literature 3 includes a first step of forming an uncured anionic electrodeposited coated film (A) by electrodepositing a base material with an anionic electrodeposition coating material (A) containing metal oxide microparticles; a second step of forming an uncured anionic electrodeposited coated film (B) by electrodepositing the base material, on which the uncured anionic electrodeposited coated film (A) is formed, with an anionic electrodeposition coating material (B); and a third step of baking and curing the uncured anionic electrodeposited coated film (A) and the uncured anionic electrodeposited coated film (B) all at once. The uncured anionic electrodeposited coated film (A) has a resistance value of 25 to 190 kΩ·cm$^2$. In the forming method, since a first coating is designed to enable the uncured anionic electrodeposited coated film (A) to have a resistance value of 25 to 190 kΩ·cm$^2$ which is less than that in the related art, it is possible to increase the electrodeposition voltage, it is possible to increase the thickness of the anionic electrodeposited coated film in a second coating without lengthening the energization time, or it is possible to obtain a good appearance.

CITATION LIST

Patent Literature

[PTL 1] Japanese Unexamined Patent Application, First Publication No. 2011-192514 (A) (claim 1 and paragraph [0013])

[PTL 2] Japanese Unexamined Patent Application, First Publication No. 2012-228338 (A) (claim 1 and paragraph [0014])

[PTL 3] Japanese Unexamined Patent Application, First Publication No. 2013-117040 (A) (claim 1 and paragraph [0017])

SUMMARY OF INVENTION

Technical Problem

In many cases, in the insulated electric wire disclosed in Patent Literature 1, resin used in the primer layer is inferior in heat resistance or insulation performance to resin used in an outer layer covering the primer layer. If the edgewise bending is performed on an insulated electric wire with a primer layer which is to be used as a coil, and a bent outer section of a film becomes thin, an outer circumferential bent section of the insulated electric wire tends to be inferior in insulation performance or heat resistance to an insulated electric wire without a primer layer having the same film thickness, which is a problem. In order to solve the problem, it is conceivable to increase the thickness of a film formed of the primer layer and an outer layer, but thereby causing various problems, such as that if the film is made thick, a bent inner section of the film is compressed and wrinkles occur therein in the edgewise bending, such as that to perform dip coating multiple times is required to make the film thick, but the number of times of drying increases, and the drying time increases, such as that adhesion between the conductor and the film deteriorates due to an oxide layer being formed at the interface therebetween, and such as that manufacturing costs increase due to the film being made thick.

In the magnet wire disclosed in Patent Literature 2, adhesion between the inner and outer films improves due to the inner and outer films being engaged with each other via the engagement portions therebetween. However, the inner film is most likely to delaminate at the interface between dissimilar materials, that is, metal which is a conductor and resin which is an insulation material. In this method, it is not possible to sufficiently improve adhesion between the inner film and the conductor wire in the rectangular wire subjected to the edgewise bending.

In the multilayer anionic electrodeposition coated film forming method disclosed in Patent Literature 3, when a multilayer coated film is formed by electrodeposition, a good adhesion is provided to a coated film in a first coating, and the amount of a curing agent is properly set to obtain a good adhesion. However, it is not possible to sufficiently improve the adhesion of the coated film in the first coating to the rectangular conductor wire, which is subjected to the edgewise bending, and the method is not applicable to systems in which curing agents are not originally used.

An object of the present invention is to solve the various problems, and to provide an insulated electric wire that exhibits a good adhesion between an insulating film and a conductor wire in a bent inner section when the insulated electric wire is subjected to bending, and a production method therefor. Another object of the present invention is to provide a coil production method using the insulated electric wire, and a coil.

The inventors have reached the present invention based on the findings that if an insulating film covering a rectangular conductor wire is formed of two layers, which are an inner layer and an outer layer, the thickness of a section of the inner layer, which covers one short side of two facing short sides of the same length of a rectangular cross section of the rectangular conductor wire, is greater than the thickness of a section of the inner layer, which covers the other short side, and the elastic modulus or the yield stress of the inner layer is less than the elastic modulus or the yield stress of the outer layer, when an insulated electric wire is wound by edgewise bending in which the insulated electric wire is bent in a state where one short side covered with the thick section of the inner layer is located inside, it is possible to absorb a load on the inner layer at the interface between the conductor wire and the inner layer in a bent inner section, and it is possible to improve adhesion between an the insulating film and the conductor wire in a bent inner section.

Solution to Problem

According to a first aspect of the present invention, as illustrated in FIG. 1, there is provided an insulated electric wire 10 formed by covering a rectangular conductor wire 11 having a rectangular cross-sectional shape with an insulating film 12. The insulating film 12 is formed of an inner layer 12A covering a surface of the rectangular conductor wire 11, and an outer layer 12B covering a surface of the inner layer. A thickness $t_1$ of a section of the inner layer 12A, which covers one short side 11A of two facing short sides of the same length of a rectangular cross section of the rectangular conductor wire 11, is greater than a thickness $t_2$, which includes that $t_2=0$, of a section of the inner layer 12A which covers the other short side 11B.

An elastic modulus of the inner layer 12A is less than an elastic modulus of the outer layer 12B, or a yield stress of the inner layer 12A is less than a yield stress of the outer layer 12B, or both of the elastic modulus and the yield stress of the inner layer 12A are less than the elastic modulus and the yield stress of the outer layer 12B.

In the insulated electric wire 10 according to a second aspect of the present invention based on the first aspect, a ratio t1/t3 of the thickness t1 of the section of the inner layer, which covers the one short side 11A, to a thickness t3 of a section of the outer layer, which covers the one short side 11A via the inner layer, is less than or equal to 1.

In the insulated electric wire 10 according to a third aspect of the present invention based on the first or second aspect, the insulating film 12 formed of the inner layer 12A and the outer layer 12B has a thickness of 40 to 65 µm.

In the insulated electric wire 10 according to a fourth aspect of the present invention based on any one of the first to third aspects, a long side/short side ratio of a length of a long side 11C to that of the short sides 11A and 11B in the rectangular cross section of the rectangular conductor wire 11 is in a range of 4 to 50, and an equivalent round wire diameter of the rectangular conductor wire 11 is in a range of 3 to 5 mm. The equivalent round wire diameter is a diameter of a true circle that has the same cross-sectional area as the cross-sectional area of a conductor wire having a cross-sectional shape other than the true circle.

In the insulated electric wire 10 according to a fifth aspect of the present invention based on any one of the first to fourth aspects, the rectangular conductor wire 11 is a copper wire. A material of the inner layer 12A is a polyimide resin or a polyamide-imide resin which has a urethane backborn or a siloxane backborn. A material of the outer layer 12B is a polyimide resin or a polyamide-imide resin.

According to a sixth aspect of the present invention, there is provided a production method for an insulated electric wire, in which an insulated electric wire is produced by forming an insulating film on a rectangular conductor wire having a rectangular cross-sectional shape owing to electrodepositing the rectangular conductor wire with an electrodeposition dispersion, the method including a first step of covering a surface of the rectangular conductor wire with a precursor layer for an inner layer using a first electrodeposition dispersion; a second step of covering a surface of the precursor layer for the inner layer of the rectangular conductor wire with a precursor layer for an outer layer using a second electrodeposition dispersion; and a third step of covering the rectangular conductor wire with two layers, which are the inner layer and the outer layer, by collectively baking the precursor layer for the inner layer and the precursor layer for the outer layer, in which the first step is performed such that a thickness of a section of the precursor layer for the inner layer, which covers one short side of two facing short sides of the same length of a rectangular cross section of the rectangular conductor wire, is greater than a thickness of a section of the precursor layer for the inner layer, which covers the other short side, and in which a contained component of the first electrodeposition dispersion and a contained component of the second electrodeposition dispersion are selected such that an elastic modulus of the inner layer is less than an elastic modulus of the outer layer, or a yield stress of the inner layer is less than a yield stress of the outer layer, or both of the elastic modulus and the yield stress of the inner layer are less than the elastic modulus and the yield stress of the outer layer.

In the production method for an insulated electric wire according to a seventh aspect of the present invention based on the sixth aspect, the first electrodeposition dispersion contains a polyimide solution or a polyamide-imide solution, which has a urethane backborn or a siloxane backborn, as the contained component, and the second electrodeposition dispersion contains a polyimide solution or a polyamide-imide solution as the contained component.

According to an eighth aspect of the present invention, there is provided a coil production method, in which a coil is produced by winding the insulated electric wire according to any one of the first to fifth aspects using edgewise bending in which the insulated electric wire is bent in a state where the one short side covered with the thick section of the inner layer is located inside.

According to a ninth aspect of the present invention, there is provided a coil that is wound multiple turns in an edgewise manner in which the insulated electric wire according to any one of the first to fifth aspects is bent in a state where the one short side covered with the thick section of the inner layer is located inside.

Advantageous Effects of Invention

In the first aspect of the present invention, since the insulating film covering the rectangular conductor wire is formed of two layers, which are the inner layer and the outer layer, the thickness of the section of the inner layer, which covers the one short side of two facing short sides of the same length of the rectangular cross section of the rectangular conductor wire, is greater than the thickness of the section of the inner layer, which covers the other short side, and the elastic modulus or the yield stress of the inner layer is less than the elastic modulus or the yield stress of the outer layer, when the insulated electric wire is wound by edgewise bending in which the insulated electric wire is bent in a state where the one short side covered with the thick section of the inner layer is located inside, the inner layer absorbs a compression stress on the insulating film at the interface between the conductor wire and the inner layer in a bent inner section, thereby having the effects such as preventing delamination or wrinkles from occurring in the inner layer, and exhibiting a good adhesion between the insulating film and the conductor wire in a bent inner section. Since the thickness of the material having a low elastic modulus or yield stress is small, small damage occurs during process, and the insulated electric wire after process exhibits a good insulation performance or heat resistance.

In the second aspect of the present invention, since the ratio t1/t3 of the thickness t1 of the section of the inner layer, which covers the one short side, to the thickness t3 of the section of the outer layer, which covers the one short side via the inner layer, is less than or equal to 1, the thickness of the inner layer becomes less than or equal to the thickness of the outer layer, thereby reducing the occupancy ratio of the inner layer which has an elastic modulus or yield stress less than an elastic modulus or yield stress of the outer layer. Therefore, the overall hardness of the insulating film is maintained, and external force during bending is prevented from causing damage to the insulating film. As a result, when bending is performed, it is possible to further improve adhesion between the insulating film and the conductor wire in the bent inner section without deteriorating the insulation breakdown voltage and the heat resistance.

In the third aspect of the present invention, since the thickness of the insulating film formed of the inner layer and the outer layer is greater than or equal to 40 μm, the insulating film exhibits a good insulation breakdown voltage and a good heat resistance. Since the thickness of the insulating film is less than or equal to 65 μm, when bending is performed, it is possible to further improve the adhesion between the insulating film and the conductor wire in the bent inner section.

In the fourth aspect of the present invention, since the rectangular conductor wire has a rectangular cross-sectional shape and the ratio (long side/short side ratio) of the length of the long side to that of the short side of the cross section is greater than or equal to 4, when the insulated electric wire is used to carry high-frequency alternating current, and current flows only at the surface of the conductor due to skin effect, it is possible to widen a current flowing region owing to the high long side/short side ratio. Since the long side/short side ratio is less than or equal to 50, bending is facilitated, and when bending is performed, it is possible to further improve the adhesion between the insulating film and the conductor wire in the bent inner section. Since the equivalent round wire diameter of the conductor wire is greater than or equal to 3 mm, the insulated electric wire can be used for high current. Since the equivalent round wire diameter is less than or equal to 5 mm, when bending is performed, it is possible to further improve the adhesion between the insulating film and the conductor wire in the bent inner section in the insulated electric wire. If high current flows through the insulated electric wire, the insulated electric wire requires high insulation performance by employing a thick insulating film. However, if the insulating film is thick, since wrinkles and delamination are likely to occur due to bending, the present invention is suitable for this case.

In the fifth aspect of the present invention, since the conductor wire is a copper wire, the conductor wire exhibits a good conductivity. Since the material of the inner layer of the insulating film is a polyimide resin or a polyamide-imide resin which has a urethane backborn or a siloxane backborn, and the material of the outer layer is a polyimide resin or a polyamide-imide resin, when bending is performed, the adhesion between the insulating film and the conductor wire in the bent inner section is high, and the insulating film exhibits a good insulation breakdown voltage and a good heat resistance.

In the sixth aspect of the present invention, since the precursor layer for the inner layer and the precursor layer for the outer layer, which cover the rectangular conductor wire, are formed by two electrodeposition steps which are the first and second steps, and the inner layer and the outer layer are formed by collectively baking the precursor layer for the inner layer and the precursor layer for the outer layer in the third step, the rectangular conductor wire is covered with the two layers while the inner layer and the outer layer are firmly in close contact with each other. Since in the first step, the thickness of the section of the inner layer, which covers the one short side of two facing short sides of the same length of the rectangular cross section of the rectangular conductor wire, is greater than the thickness of the section of the inner layer, which covers the other short side, and the contained component of the first electrodeposition dispersion and the contained component of the second electrodeposition dispersion are selected such that either the elastic modulus or the yield stress, or both of the elastic modulus or the yield stress of the inner layer is less than the elastic modulus or the yield stress of the outer layer, when the insulated electric wire is wound by edgewise bending in which the insulated electric wire is bent in a state where the one short side covered with the thick section of the inner layer is located inside, the inner layer absorbs a compression stress on the insulating film at the interface between the conductor wire and the inner layer in the bent inner section, thereby having the effects such as preventing wrinkles from occurring in the inner layer, and exhibiting a good adhesion between the insulating film and the conductor wire in the bent inner section.

In the seventh aspect of the present invention, since the first electrodeposition dispersion contains a polyimide solution or a polyamide-imide solution, which has a urethane backborn or a siloxane backborn, as the contained component, and the second electrodeposition dispersion contains a polyimide solution or a polyamide-imide solution as the contained component, it is possible to improve the adhesion between the insulating film and the conductor wire in the bent inner section, and to improve the insulation breakdown voltage and the heat resistance of the insulated electric wire.

In the eighth aspect of the present invention, when the coil is produced by winding the insulated electric wire in the edgewise bending in which the insulated electric wire is bent in a state where the one short side covered with the thick section of the inner layer is located inside, the insulating film of the insulated electric wire does not delaminate from the conductor wire, and wrinkles do not occur, which become causes of insulation failure.

In the ninth aspect of the present invention, since the coil produced from the insulated electric wire exhibits a good adhesion between the insulating film and the conductor wire in the bent inner section, delamination or wrinkles induced by winding do not occur, and the coil exhibit a good insulation performance.

DESCRIPTION OF EMBODIMENTS

Subsequently, an embodiment of the present invention will be described with reference to the drawings.
[Insulated Electric Wire]

Figure 1:
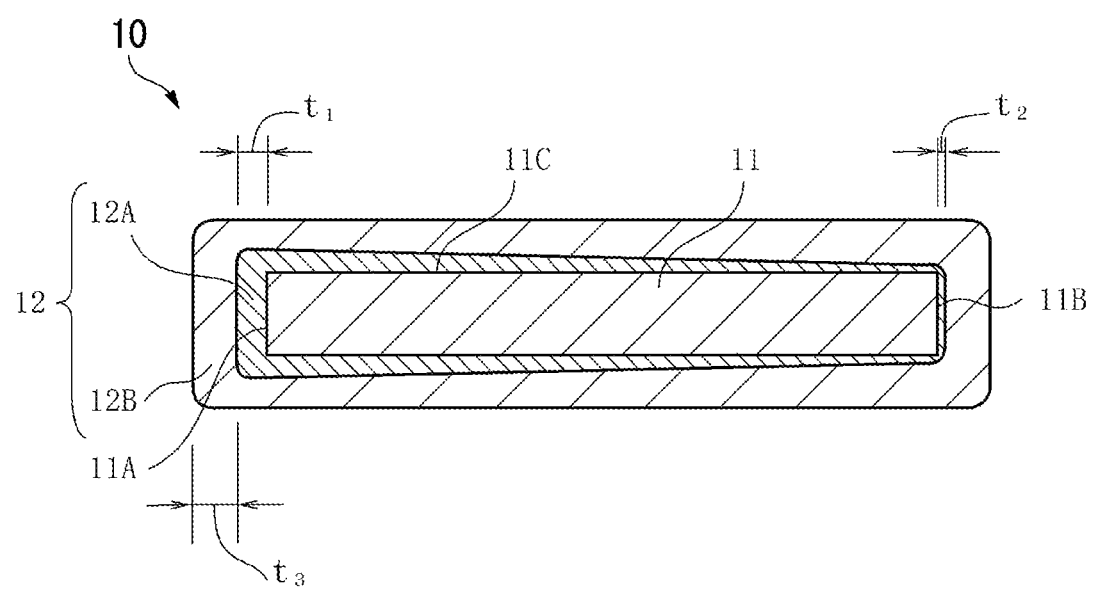
FIG. 1 is a cross-sectional view of an insulated electric wire in an embodiment of the present invention.

As illustrated in FIG. 1, an insulated electric wire 10 of the embodiment is an insulated electric wire for winding, which is formed by covering a rectangular conductor wire 11 having a rectangular cross-sectional shape with an insulating film 12. Since the conductor wire has a rectangular shape, specifically, a rectangular shape, when a coil is manufactured by winding the insulated electric wire, it is possible to increase the occupancy ratio of a cross-sectional area of the conductor wire to a cross-sectional area of the coil compared to that of a conductor wire having a circular cross-sectional shape. The distinguishing points of the insulated electric wire 10 include that the insulating film 12 is formed of an inner layer 12A covering a surface of the rectangular conductor wire 11, and an outer layer 12B covering a surface of the inner layer; that a thickness $t_1$ of a section of the inner layer 12A, which covers one short side 11A of two facing short sides of the same length of a rectangular cross section of the rectangular conductor wire 11, is greater than a thickness $t_2$ (including that $t_2=0$) of a section of the inner layer 12A, which covers the other short side 11B; and that the elastic modulus of the inner layer 12A is less than the elastic modulus of the outer layer 12B, the yield stress of the inner layer 12A is less than the yield stress of the outer layer 12B, or both of the elastic modulus and the yield stress of the inner layer 12A are less than the elastic modulus and the yield stress of the outer layer 12B. In FIG. 1, in order to facilitate understanding, the thickness of each of the inner layer 12A and the outer layer 12B of the insulating film 12 is illustrated in an enlarged manner compared to the dimensions of the rectangular conductor wire 11.

If one short side 11A of the rectangular conductor wire 11 is thickly covered with the inner layer 12A having the elastic modulus and the yield stress less than those of the outer layer, a surface of the inner layer is covered with the outer layer, and the short side 11A becomes a bent inner section in the edgewise bending, even though bending compression stress is intensively exerted to a section which is likely to delaminate or wrinkle, it is possible to reduce burden on the interface between the conductor wire and the insulating film, and delamination or wrinkles do not occur in the insulating film of the insulated electric wire.

The lower the elastic modulus of a film becomes in an elastic region, and the lower the yield stress of the film becomes in a plastic region, in the bending of an insulated electric wire, the lower stress occurs in the film, which means that burden on the interface is small. As a result, the delamination or wrinkles of the film is unlikely to occur. Since depending on the material of the insulating film, the insulating film may break before yielding, in the present invention, the elastic modulus also is specified in addition to the yield stress. It is possible to accurately express the bending stress of the film by specifying the yield stress and the elastic modulus. If a large degree of deformation is induced by bending, and a plastic deformation of resin of the insulating film is dominant, it is possible to simply express effects of the bending stress of the film by the yield stress.

The insulating film of the embodiment preferably has a thickness of 40 to 65 μm, and more preferably has a thickness of 40 to 50 μm. If the thickness of the insulating film is less than 40 μm, since the film thickness is thin, the insulating film cannot exhibit insulation performance enough to withstand the usage in a motor or reactor, which is a concern. If the film thickness exceeds 65 μm, when the bending is performed for winding, a bent inner section of the insulating film is likely to delaminate from the conductor wire, or wrinkles are likely to occur. If the insulated electric wire is covered by electrodeposition, since a large amount of a solvent or the like volatilizes, defects such as bubbles are likely to occur in the film in a baking step.

In the rectangular cross section of the rectangular conductor wire 11 of the embodiment, preferably, the ratio (long side/short side) of the length of a long side 11C to that of the short sides 11A and 11B is greater than or equal to 4, and an equivalent round wire diameter is greater than or equal to 3 mm. The reason for this is that when a coil is manufactured by winding the insulated electric wire, it is possible to increase the occupancy ratio of the cross-sectional area of the conductor wire to the cross-sectional area of the coil. Particularly, when the long side/short side ratio is greater than or equal to 4, if the insulated electric wire is used to carry high-frequency alternating current and current flows only at the surface of the conductor due to skin effect, it is possible to widen a current flowing region owing to the high long side/short side ratio. If an upper limit is set, preferably, the long side/short side ratio is less than or equal to 50, and the equivalent round wire diameter of the conductor wire is less than or equal to 5 mm. The reason for this is that in a bending operation, bending is facilitated, and it is possible to further improve adhesion between the insulating film and the conductor wire in the bent inner section. If the long side/short side ratio exceeds 50, the flatness of the rectangular conductor wire becomes excessively large, and due to bending, the conductor wire is likely to be twisted, or cracking is likely to occur.

More preferably, the long side/short side ratio is, but is not specifically limited to being, in a range of 5 to 45.

In the rectangular conductor wire 11 of the embodiment, preferably, the ratio ($t_1/t_3$) of the thickness t1 of the section of the inner layer, which covers one short side 11A, to a thickness $t_3$ of a section of the outer layer, which covers one short side 11A via the inner layer, is less than or equal to 1. The reason for this is to decrease the occupancy ratio of the inner layer, which has the elastic modulus or yield stress less than the elastic modulus or yield stress of the outer layer, by making the thickness of the inner layer less than or equal to the thickness of the outer layer. Therefore, when bending is performed, it is possible to further improve adhesion between the insulating film and the conductor wire in the bent inner section without deteriorating the insulation breakdown voltage and the heat resistance of the insulating film. The ratio $t_1/t_3$ more preferably is in a range of 0.14 to 1, further more preferably, in a range of 0.15 to 0.35.

In the embodiment, examples of the material of the conductor wire of the insulated electric wire include copper, copper alloys, aluminum, aluminum alloys, and stainless steels. The conductor wire is preferably made of copper among the exemplified materials because the copper wire has a higher conductivity. Examples of the material of the outer layer of the insulating film can include polyimide (hereinafter referred to as PI) resin, polyamide-imide (hereinafter referred to as PAI) resin, polyester imide resin, acrylic resin, epoxy resin, epoxy acrylic resin, polyester resin, polyurethane resin, and fluorine resin. The polyimide resin or polyamide-imide resin is preferably used among the exemplified materials, from the viewpoint of having a high insulation breakdown voltage and a high heat resistance. Examples of the material of the inner layer of the insulating film can include P1 resin, PAI resin, polyester imide resin, acrylic resin, epoxy resin, epoxy acrylic resin, and polyester resin, which have a urethane backborn or a siloxane backborn. The PI resin or PAI resin, which has a urethane backborn or a siloxane backborn and has a relatively low elastic modulus or yield ratio, is preferably used among the exemplified materials.

[Production Method for Insulated Electric Wire]

The insulated electric wire of the embodiment is manufactured by forming an insulating film on a conductor wire using a dipping method or electrodeposition method. When an insulating film is formed by the dipping method, a film with a thickness of 1 to 10 μm can be coated in one cycle of a film coating step. In order to obtain an insulation breakdown voltage required for usage in a motor or reactor for hybrid vehicles or electric vehicles, it is necessary to perform the coating step and the baking step multiple times. In this case, since the drying of an inner film layer proceeds compared to the drying of an outer film layer under the necessity of performing the baking step multiple times, in order to obtain a film which is uniformly dried as a whole, it is necessary to change the coating agent for the coating step each time, or to change the temperature or time of the baking step each time. Since particularly, a first layer of film in contact with the conductor is highly dried due to being subjected to the baking step many time, the film deteriorates and becomes a cause of insulation failure when manufacturing a coil, and thus it is necessary to perform a first drying at a low temperature.

When an inner layer of the insulating film of the embodiment is formed by the dipping method, a precursor layer for the inner layer is formed by causing a rectangular conductor wire to horizontally pass through an insulation coating liquid, which is stored in an insulation coating material reservoir, with the long sides of the rectangular conductor wire aligned in a vertical direction. Subsequently, an inner layer is formed by baking the precursor layer for the inner layer, which has passed through the insulation coating liquid, while allowing the precursor layer for the inner layer in a wet state to be collected on one short side using gravity. Consecutively, a precursor layer for the outer layer of a uniform thickness is formed by causing the entirety of the rectangular conductor wire to horizontally pass through an insulation coating liquid stored in another insulation coating material reservoir. Thereafter, an outer layer is formed by baking the precursor layer for the outer layer, thereby forming an insulating film formed of two layers, that is, the inner layer and the outer layer.

If an insulating film is formed by the electrodeposition method, since it is possible to simply form the inner layer and the outer layer of the embodiment on a surface of a rectangular conductor wire, the formation of the insulating film by the electrodeposition method is suitable for the present invention. In the electrodeposition method, firstly, electrodeposition dispersions, which are insulation electrodeposition coating materials, are prepared for an inner layer and an outer layer, respectively. The electrodeposition dispersion for the inner layer is referred to as a first electrodeposition dispersion, and the electrodeposition dispersion for the outer layer is referred to as a second electrodeposition dispersion. Both of the first electrodeposition dispersion and the second electrodeposition dispersion contain polymer, an organic solvent, and water. Specifically, each of the first electrodeposition dispersion and the second electrodeposition dispersion is a water-based electrodeposition dispersion in which polymer is dispersed in water, or a mixed electrodeposition dispersion in which polymer is dispersed in a mixed liquid of an organic solvent and water. Examples of the polymer of the first electrodeposition dispersion include the resins exemplified as the material of the inner layer. Examples of the polymer of the second electrodeposition dispersion include the resins exemplified as the material of the outer layer. Examples of the organic solvent in both of the first electrodeposition dispersion and the second electrodeposition dispersion include N, N-dimethylformamide (DMF), N, N-dimethylacetamide (DMAc), dimethylsulfoxide (DMSO), N-methylpyrrolidone (NMP), γ-butyrolactone (γBL), anisole, tetramethylurea, and sulfolane. NMP is preferable among the exemplified materials.

In the embodiment, the first electrodeposition dispersion is prepared by a process in which PI or PAI is neutralized by adding a neutralizing agent into a solution, which is obtained by dissolving PI resin or PAI resin (which is polymer) having a urethane backborn or a siloxane backborn in NMP and DMI, and stirring the solution, and then PI or PAI is precipitated by adding water (which is an antisolvent for PI or PAI) into the solution, mixing the water with the solution, and stirring the mixed solution. The second electrodeposition dispersion is prepared by a process in which PI or PAI is neutralized by adding a neutralizing agent into a solution, which is obtained by dissolving PI resin or PAI resin as polymer in NMP and DMI, and stirring the solution, and then PI or PAI is precipitated by adding water (which is an antisolvent for PI or PAI) into the solution, mixing the water with the solution, and stirring the mixed solution. In both of the first electrodeposition dispersion and the second electrodeposition dispersion, preferably, the concentration of the polymer is 1 to 10% by mass with respect to 100% by mass of the mixed solvent of water and the organic solvent, and the concentration of the organic solvent is 1 to 70% by mass.

Hereinbelow, a method for producing an insulated electric wire using the first electrodeposition dispersion and the second electrodeposition dispersion will be described with reference to FIG. 2. An electrodeposition coating apparatus 20 illustrated in FIG. 2 has a first electrodeposition bath 22 that stores a first electrodeposition dispersion 21; a second electrodeposition bath 26 that stores a second electrodeposition dispersion 24; and a baking furnace 27. Both of the first electrodeposition dispersion 21 and the second electrodeposition dispersion 24 are preferably maintained at a temperature of 5 to 60° C.

Figure 2:
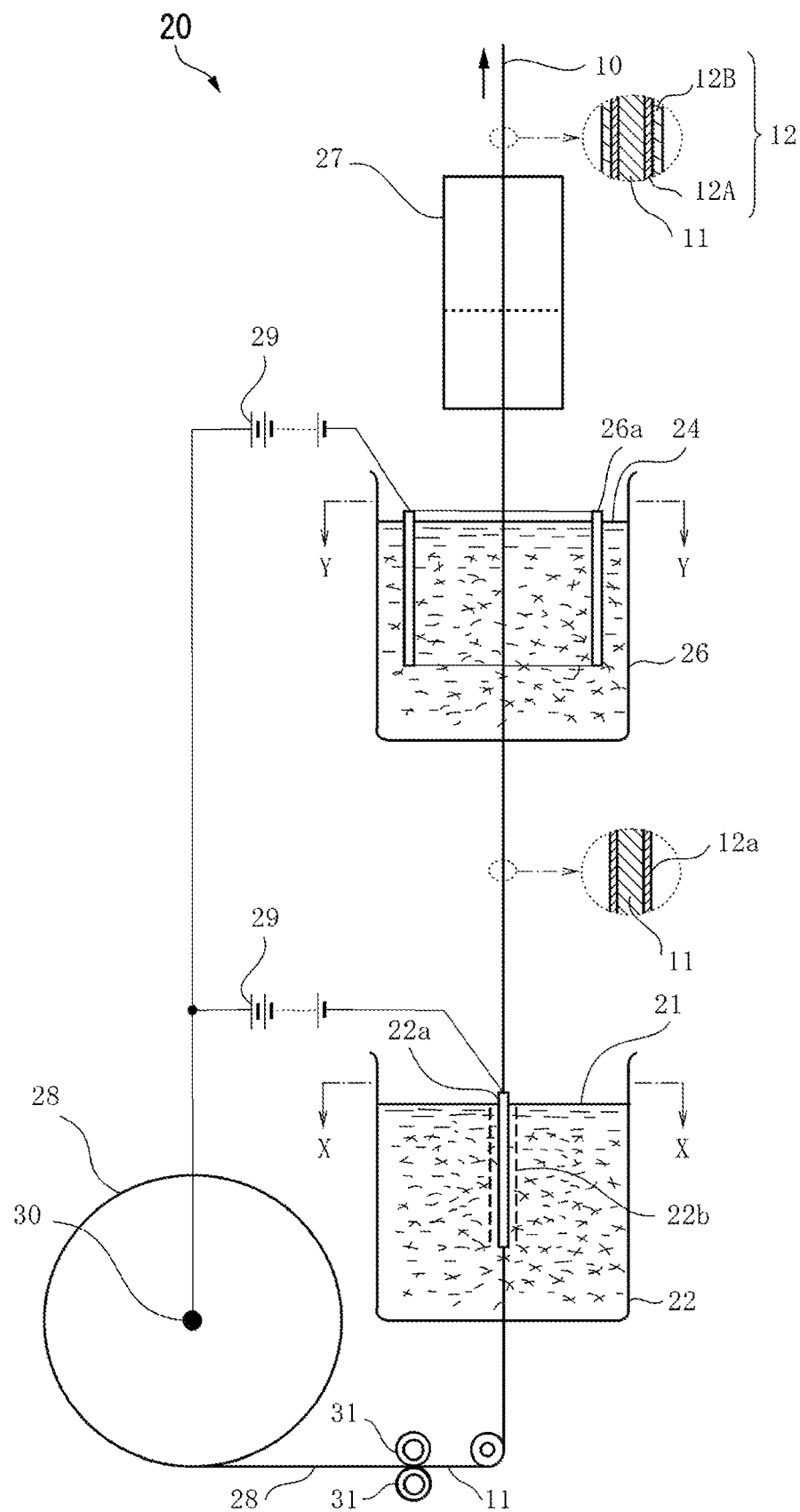
FIG. 2 is a schematic diagram illustrating a process of forming an insulating film on a surface of a conductor wire using an electrodeposition coating apparatus in the embodiment of the present invention.
Figure 3:
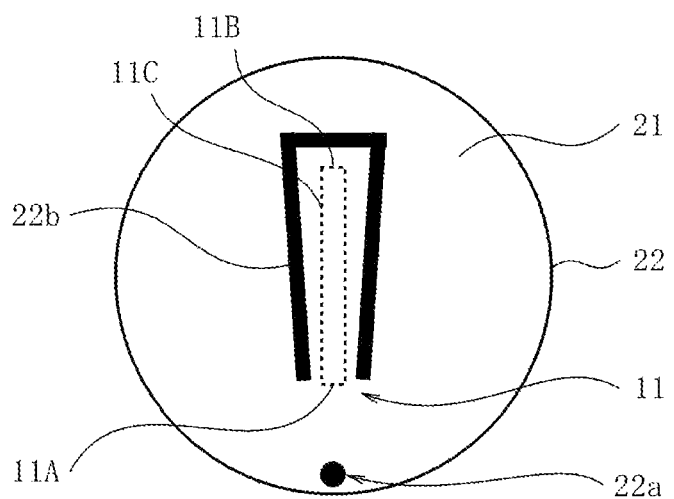
FIG. 3 is a cross-sectional view taken along line X-X of FIG. 2, and illustrating a cathode structure in a first step in the embodiment.

As illustrated in FIG. 3, the first electrodeposition bath 22 is circularly shaped in a plan view. A cathode pole 22a is vertically hung at a corner (on a lower side in the drawing sheet) of the first electrodeposition bath 22 so as to be positioned in the first electrodeposition dispersion 21. The rectangular conductor wire 11 passes through the center of the first electrodeposition bath 22 in which the first electrodeposition dispersion 21 is stored. The cathode pole 22a disposed in the first electrodeposition dispersion 21 is grounded (refer to FIG. 2). As illustrated in FIG. 3, an insulation cover 22b is hung surrounding the long sides 11C and the other short side 11B of the rectangular conductor wire 11, which passes through the first electrodeposition dispersion 21, so as to be positioned in the first electrodeposition dispersion 21. The insulation cover 22b has substantially the same length as that of the cathode pole 22a, and is formed in an inverted U shape in a planar cross-sectional view. In other words, as illustrated in FIG. 3, the insulation cover 22b surrounds the entirety of the rectangular conductor wire 11 except one short side 11A of the rectangular conductor wire 11. The insulation cover 22b is formed such that the space between the insulation cover 22b and the long side 11C of the rectangular conductor wire 11 becomes widened as the long sides 11C approach the other short side 11B of the rectangular conductor wire 11. One short side 11A faces the cathode pole 22a. Fluorine resin, for example, polytetrafluoroethylene resin is preferably used as the material of the insulation cover 22b.

Figure 4:
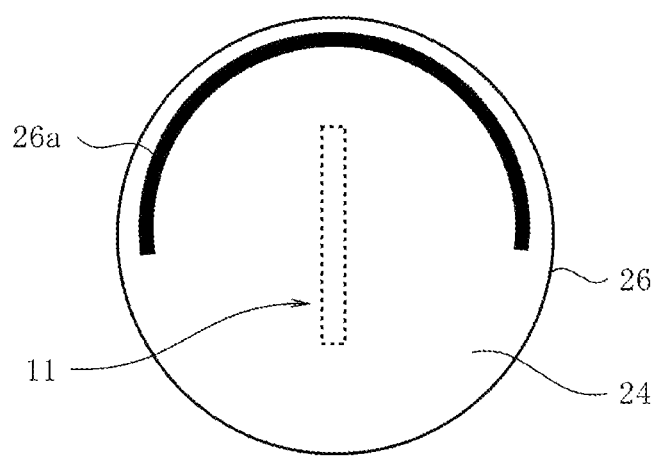
FIG. 4 is a cross-sectional view taken along line Y-Y of FIG. 2, and illustrating a cathode structure in a second step in the embodiment.

As illustrated in FIG. 4, the second electrodeposition bath 26 is circularly shaped in a plan view. A cathode plate 26a having a half-cylindrical shape is vertically hung positioned in the second electrodeposition dispersion 24 so as to occupy a region corresponding to an inner half circumference of the second electrodeposition bath 26. The rectangular conductor wire 11 passes through the center of the second electrodeposition bath 26 in which the second electrodeposition dispersion 24 is stored. The cathode plate 26a disposed in the second electrodeposition dispersion 24 is grounded (refer to FIG. 2).

A conductor wire 28, which is cylindrically wound and has a circular cross-sectional shape, is electrically connected to an anode 30 of a direct current power supply 29 in advance. The conductor wire 28 having a circular cross-sectional shape is pulled in a solid arrow direction of FIG. 2, and goes through the next steps.

Firstly, in a preliminary step, the rectangular conductor wire 11 having a rectangular cross-sectional shape is formed by flat-rolling the conductor wire 28 having a circular cross-sectional shape using a pair of rolling rollers 31, 31. Subsequently, in a first step, the rectangular conductor wire 11 passes through the first electrodeposition dispersion 21 stored in the first electrodeposition bath 22.

When the rectangular conductor wire 11 passes through the first electrodeposition dispersion 21 in the first electrodeposition bath 22, a direct current voltage of the direct current power supply 29 is applied between the rectangular conductor wire 11 and the cathode pole 22a. The direct current voltage of the direct current power supply 29 preferably is in a range of 1 to 500 V, and the energization time of the direct current preferably is in a range of 0.01 to 60 seconds. Therefore, negatively charged PI or PAI particles (not illustrated) having a urethane backborn or a siloxane backborn are electrodeposited on the surface of the rectangular conductor wire 11 in the first electrodeposition dispersion 21 to form an insulation layer for the inner layer (not illustrated). As illustrated in FIG. 3, since the rectangular conductor wire 11 except one short side 11A is covered with the insulation cover 22b, a large amount of PI or PAI particles having a urethane backborn or a siloxane backborn are precipitated on one short side 11A, and a small amount of PI or PAI particles are precipitated as the other short side 11B is approached. As illustrated in a partial enlarged view of FIG. 2, the insulation layer for the inner layer, which is formed on the surface of the rectangular conductor wire that has passed through the first electrodeposition dispersion 21, becomes a precursor layer 12a for the inner layer.

Subsequently, the rectangular conductor wire 11 having the surface covered with the precursor layer 12a for the inner layer advances to the second step, and passes through the second electrodeposition bath 26. When the rectangular conductor wire 11 passes through the second electrodeposition dispersion 24 in the second electrodeposition bath 26, a direct current voltage of the direct current power supply 29 is applied between the rectangular conductor wire 11 and the cathode plate 26a. The direct current voltage of the direct current power supply 29 preferably is in a range of 1 to 500 V, and the energization time of the direct current preferably is in a range of 0.01 to 150 seconds. Therefore, negatively charged PI or PAI particles (not illustrated) are electrodeposited on a surface of the precursor layer (with which the rectangular conductor wire 11 is covered) 12a for the inner layer in the second electrodeposition dispersion 24 to form an insulation layer for the outer layer (not illustrated). As illustrated in FIG. 4, since the rectangular conductor wire 11 covered with the precursor layer 12a for the inner layer is surrounded by the cathode plate 26a having a half-cylindrical shape, a precursor layer (not illustrated) for the outer layer of a uniform thickness is formed on the entire surface of the precursor layer 12a for the inner layer in the second electrodeposition dispersion 24.

Consecutively, in a third step, the rectangular conductor wire 11, which has passed through the second electrodeposition dispersion 24 and on which the precursor layer 12a for the inner layer and the precursor layer for the outer layer are formed, is baked in the baking furnace 27. As a result, as illustrated in a partial enlarged view of FIG. 2, the inner layer 12A and the outer layer 12B are formed on the surface of the rectangular conductor wire 11, and thus the insulated electric wire 10 illustrated in FIG. 1 is produced.

Examples of the baking furnace 27 include a near-infrared heating furnace, a hot air heating furnace, an induction heating furnace, a far-infrared heating furnace, and a furnace using temperature-controlled air or inert gas such as nitrogen. The furnaces can be used individually or in combination. Hot-air heating and infrared heating are preferably used in combination to increase a baking speed. In the hot-air heating, in a state where the temperature of the furnace is controlled in a range of 200 to 500° C., high-speed gas may be used, and gas may enter the furnace such that the average flow speed of the gas inside the furnace is approximately in a range of 1 to 10 m/min. A gas temperature is desirably controlled approximately in a range of 200 to 500° C. for the same reason as with the temperature of the furnace. A baking time is preferably controlled in a range of 1 to 10 minutes. If the baking temperature is less than 200° C., it is not possible to satisfactorily perform baking, and if the baking temperature exceeds 500° C., the solvent or the like rapidly volatilizes at an initial phase of the baking, which may cause defects such as bubbles to occur in the film. The resin may be thermally decomposed due to the high temperature. The baking temperature is the temperature of a central region inside the baking furnace.

The baking is an important treatment that determines adhesion between the insulating film and the conductor wire in a bent inner section when the insulated electric wire is bent (which will be described), and the softening resistance of the insulating film. If overbaking is performed, when the insulated electric wire is bent, since the resin deteriorates, the interface is oxidized, or the like, a bent inner section of the insulating film delaminates from the conductor wire, wrinkles occur in the bent inner section of the insulating film, or fracturing occurs in the bent outer section of the insulating film. If baking is not sufficiently performed, since an excessive amount of the organic solvent remains in the insulating film, the softening temperature decreases.

[Coil Production Method]

A coil is produced by winding the insulated electric wire 10, which is formed by covering the rectangular conductor wire 11 with the insulating film 12 formed of two layers which are the inner layer 12A and the outer layer 12B, using a coil forming apparatus (not illustrated). In the embodiment, the coil is produced by the edgewise bending in which an insulated electric wire is wound in a state where one short side (edge surface) of a conductor wire having a rectangular cross-sectional shape is located on an inner-diameter surface, and the other short side (edge surface) is located on an outer-diameter surface. The coil may be produced from an insulated electric wire by the flatwise bending in which long sides (flat surfaces) of a conductor wire having a rectangular cross-sectional shape are bent.

EXAMPLES

Subsequently, examples and comparative examples of the present invention will be described in detail.

Example 1

A rectangular copper wire as a conductor wire having a thickness of 1.5 mm and a width of 6.5 mm was covered with an insulating film by the electrodeposition coating apparatus illustrated in FIG. 2. A water-based electrodeposition dispersion insulating coating material containing 2% by mass of polyamide-imide (PAI) having a urethane backborn was prepared as the first electrodeposition dispersion, and was stored in the first electrodeposition bath. A water-based electrodeposition dispersion insulating coating material containing 2% by mass of polyamide-imide (PAI) was prepared as the second electrodeposition dispersion, and was stored in the second electrodeposition bath. The cathode pole was disposed in the first electrodeposition bath as illustrated in FIG. 3, and the cathode plate having a half-cylindrical shape was disposed in the second electrodeposition bath as illustrated in FIG. 4. As illustrated in FIGS. 3 and 4, the rectangular copper wire passed through the centers of the first electrodeposition bath and the second electrodeposition bath. A baking furnace for baking the rectangular copper wire which passed through the second electrodeposition bath was an electric furnace (far-infrared heating furnace) having a length of 2.5 m. A thermocouple was installed on a furnace wall, and the inner furnace temperature could be set at a desired temperature. A plurality of electric heaters were provided in an advance direction of the copper wire. The temperatures of the electric heaters could be individually set so that only a desired length of the copper wire could be baked. The outputs of the heaters were set such that only the 1.2 m length of the copper wire could be baked.

An insulated electric wire was produced by covering the rectangular copper wire with an insulating film under the following conditions using the electrodeposition coating apparatus with such configuration. That is, as illustrated in Table 1, the direct current voltage was set at 100 V, the temperature of each of the first electrodeposition dispersion and the second electrodeposition dispersion was adjusted at approximately 20° C., the electrodeposition time of the first electrodeposition bath was adjusted at 10 seconds, and the electrodeposition time of the second electrodeposition bath was adjusted at 130 seconds. The electrodeposition times were set by adjusting the liquid amounts of the first electrodeposition dispersion and the second electrodeposition dispersion which were stored in the first electrodeposition bath and the second electrodeposition bath, respectively. The baking furnace was set at 300° C., and the rectangular copper wire with the insulating film were dried and heated inside the furnace for 5 minutes.

Examples 2 to 6 and Comparative Examples 1 to 3

Figure 5:
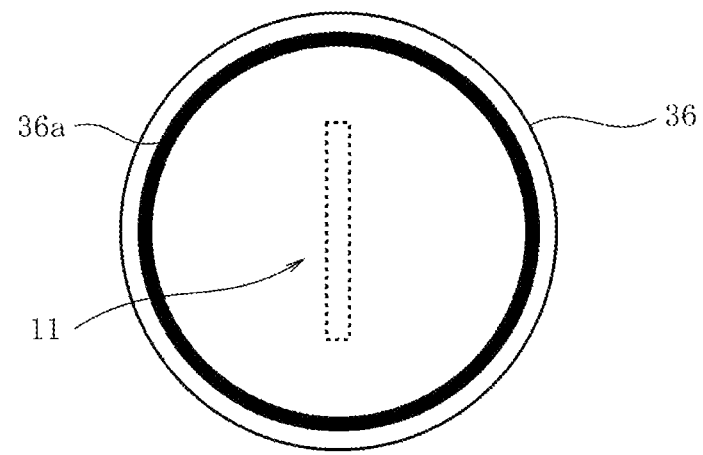
FIG. 5 is a cross-sectional view corresponding to the cross-sectional view taken along line X-X of FIG. 2, and illustrating a cathode structure in Comparative Examples 1 to 3.

Insulated electric wires of Examples 2 to 6 and Comparative Examples 1 to 3 were produced under the condition that main components of the first and second electrodeposition dispersions, the long and short sides of the rectangular conductor wires, the equivalent round wire diameters of the rectangular conductor wires, and production conditions of the insulated electric wires were changed as illustrated in Table 1, and others remained unchanged as illustrated in Example 1. In Example 4, the insulated electric wire was produced using a water-based electrodeposition dispersion insulating coating material containing PI having a siloxane backborn, as the first electrodeposition dispersion. In Comparative Examples 1 to 3, the insulated electric wires were produced by causing the rectangular conductor wires to pass through only the second electrodeposition dispersion without allowing the rectangular conductor wires to pass through the first electrodeposition dispersion. As illustrated in FIG. 5, the electrodeposition bath was circularly shaped in a plan view, and a cathode plate 36a having a cylindrical shape was disposed occupying the entire inner circumference of an electrodeposition bath 36. The rectangular conductor wires 11 passed through the center of the electrodeposition bath 36 in which the electrodeposition dispersion 34 is stored.

short side A and is approximately 2 μm away from the conductor, and the indentation elastic modulus of the outer layer was measured at a location 5 μm away from an outer circumference of the film.

(2) Thicknesses ($t_1$, $t_2$, and $t_3$) of Insulating Film

TABLE 1

| | Cross Section of Rectangular Conductor Wire | | | Equivalent Round wire | Production Conditions of Insulated Electric Wire | | | | |
|---|---|---|---|---|---|---|---|---|---|
| | | | | | Applied | First Electrodeposition Dispersion | | Second Electrodeposition Dispersion | | Baking |
| | Long Side (mm) | Short Side (mm) | Long Side/ Short Side | Diameter (mm) | Voltage (V) | Main Component | Electro- deposition Time (sec) | Main Component | Electro- deposition Time (sec) | Temperature (° C.) |
| Example 1 | 6.5 | 1.5 | 4.3 | 3.5 | 100 | PAI with Urethane Backbone | 10 | PAI | 130 | 300 |
| Example 2 | 6.5 | 1.5 | 4.3 | 3.5 | 100 | PAI with Urethane Backbone | 40 | PAI | 60 | 300 |
| Example 3 | 6.5 | 1.5 | 4.3 | 3.5 | 400 | PAI with Urethane Backbone | 5 | PAI | 150 | 300 |
| Example 4 | 6.5 | 1.5 | 4.3 | 3.5 | 100 | PI with Siloxane Backbone | 10 | PAI | 130 | 300 |
| Example 5 | 18 | 0.4 | 45 | 3.0 | 100 | PAI with Urethane Backbone | 10 | PAI | 130 | 300 |
| Example 6 | 18 | 0.3 | 60 | 2.6 | 100 | PAI with Urethane Backbone | 10 | PAI | 130 | 300 |
| Comparative Example 1 | 6.5 | 1.5 | 4.3 | 3.5 | 100 | — | — | PAI | 130 | 300 |
| Comparative Example 2 | 6.5 | 1.5 | 4.3 | 3.5 | 500 | — | — | PAI | 130 | 300 |
| Comparative Example 3 | 18 | 0.4 | 45 | 3.0 | 100 | — | — | PAI | 130 | 300 |

<Evaluation of Comparison Tests>

The insulated electric wires obtained in Examples 1 to 6 and Comparative Examples 1 to 3 were examined for the elastic modulus of each inner layer and the elastic modulus of each outer layer in the insulating films, the thicknesses ($t_1$ and $t_2$) on one short side A and the other short side B of the inner layer of each insulating film, the thickness ($t_3$) on one short side A of the outer layer, the total film thickness of the insulating film, and adhesion of the insulating film. Table 2 shows the results.

(1) Elastic Modulus of Inner Layer and Elastic Modulus of Outer Layer in Insulating Film Specimens with the cross sections of the insulating films exposed were manufactured by cutting approximately 1 cm of the insulated electric wires, embedding the cut insulated electric wires in epoxy resin, and grinding the resin and the insulated electric wires. Load-displacement curves were acquired by applying a load of 100 mgf via a Barcovitch indenter using a micro-indentation hardness test machine (ENT-1100a manufactured by ELIONIX Ltd.), and the indentation elastic modulus of the inner layer and the indentation elastic modulus of the outer layer of each insulating film were measured from the load-displacement curves using a Sawa and Tanaka correction method. For each pre-obtained specimen with the cross section exposed, the indentation elastic modulus of the inner layer was measured in the film at a location which is adjacent to the The thicknesses ($t_1$ and $t_2$) on one short side A and the other short side B of the inner layer of each insulating film were determined by performing pre-estimation. Specifically, the insulated electric wires were manufactured by performing electrodeposition using only the first electrodeposition bath, and performing baking under the conditions shown in Table 1. Specimens with the cross sections of the insulating films exposed were manufactured by cutting approximately 1 cm of the manufactured insulated electric wires, embedding the cut insulated electric wires in epoxy resin, and grinding the resin and the insulated electric wires. The thickness ($t_1$) on the short side A of the inner layer of the film, and the thickness ($t_2$) on the short side B of the inner layer of the film were measured by capturing an image of the cross section of each specimen using an optical microscope. The thickness ($t_3$) on one short side A of the outer layer of each insulating film was measured by the following method. That is, specimens with the cross sections of the insulating films exposed were manufactured by cutting approximately 1 cm of the obtained insulated electric wires, embedding the cut insulated electric wires in epoxy resin, and grinding the resin and the insulated electric wires. The total thickness of the inner layer and the outer layer of the film, specifically, the total thickness on the short side A was measured by capturing an image of the cross section of each specimen using an optical microscope, and the thickness ($t_3$) on one short side A of the outer layer was measured by subtracting the pre-obtained thickness ($t_1$) on the short side A of the inner layer from the total thickness.

If composition elements differ between the inner layers and the outer layers, after specimens with the cross sections exposed are manufactured, the film thicknesses of the inner layers and the outer layers may be measured by carrying out ESD analysis using SEM. The elastic modulus and the film thickness may be simultaneously measured by thoroughly measuring the elastic modulus of each specimen, which has the cross section exposed in the micro-indentation hardness test, in a film thickness direction.

(3) Total Film Thickness of Insulating Film

After the thickness of the entire insulated electric wire was measured in a state where the long sides of the insulated electric wire were pinched by a micrometer (manufactured by MITUTOYO Ltd.), the film thickness of the insulating film was obtained by subtracting the thickness of the rectangular conductor wire from the measured thickness, and halving the resultant value.

(4) Adhesion of Insulating Film 10 cm of each insulated electric wire was cut, and the cut insulated electric wire was 90 degrees bent along a round bar with a diameter by the edgewise bending using an apparatus used to produce a coil for a motor or reactor, such that a bending radius becomes equal to the diameter of the insulated electric wire. It was examined whether wrinkles or delamination occurred in a bent inner section of the insulating film, while magnifying the bent insulated electric wire 20 times using an optical microscope.

covering one short side A was greater than the thickness of the inner layer covering the other short side B, and the elastic modulus of the inner layer was less than the elastic modulus of the outer layer, delamination and wrinkles were not observed in a bent inner section of insulated electric wire in the adhesion test.

INDUSTRIAL APPLICABILITY

An insulated electric wire of the present invention can be used to produce a coil for usage in a reactor or motor for hybrid vehicles or electric vehicles.

REFERENCE SIGNS LIST

10: insulated electric wire
11: rectangular conductor wire
11A: one short side of conductor wire
11B: the other short side of conductor wire
11C: long side of conductor wire
12: insulating film
12A: inner layer of insulating film
12B: outer layer of insulating film
20: electrodeposition coating apparatus
21: first electrodeposition dispersion

TABLE 2

| | Insulating Film | | | | | | | | |
|---|---|---|---|---|---|---|---|---|---|
| | Inner Layer | | | | Outer Layer | | | | |
| | Material | Elastic Modulus (GPa) | Short Side A Layer Thickness $t_1$ (μm) | Short Side B Layer Thickness $t_2$ (μm) | Material | Elastic Modulus (GPa) | Long Side A Layer Thickness $t_3$ (μm) | $t_1/t_3$ | Total Film Thickness (μm) | Delamination/Wrinkle on Inner Side in Edgewise Bending |
| Example 1 | PAI with Urethane backborn | 4.6 | 5 | 0 | PAI | 5.1 | 35 | 0.14 | 40 | No Occurrence |
| Example 2 | PAI with Urethane backborn | 4.6 | 20 | 10 | PAI | 5.1 | 20 | 1 | 40 | No Occurrence |
| Example 3 | PAI with Urethane backborn | 4.6 | 10 | 2 | PAI | 5.1 | 55 | 0.18 | 65 | No Occurrence |
| Example 4 | PI with Siloxane backborn | 3.0 | 5 | 0 | PAI | 5.1 | 35 | 0.14 | 40 | No Occurrence |
| Example 5 | PAI with Urethane backborn | 4.6 | 5 | 0 | PAI | 5.1 | 35 | 0.14 | 40 | No Occurrence |
| Example 6 | PAI with Urethane backborn | 4.6 | 5 | 0 | PAI | 5.1 | 35 | 0.14 | 40 | No Occurrence |
| Comparative Example 1 | — | — | — | — | PAI | 5.1 | 40 | 0 | 40 | Wrinkle Occurrence |
| Comparative Example 2 | — | — | — | — | PAI | 5.1 | 40 | 0 | 65 | Wrinkle/ Delamination Occurrence |
| Comparative Example 3 | — | — | — | — | PAI | 5.1 | 40 | 0 | 40 | Wrinkle/ Delamination Occurrence |

As becoming obvious from Table 2, in Comparative Examples 1 to 3, since the insulating film of each insulated electric wire was not made to have a two-layer structure including the inner layer and the outer layer, delamination and wrinkles were observed in a bent inner section of the insulating film in the adhesion test. On the contrary, in Examples 1 to 6, since the thickness of the inner layer

22: first electrodeposition bath
22a: cathode pole
22b: insulation cover
24: second electrodeposition dispersion
26: second electrodeposition bath
26a: cathode plate
27: baking furnace

The invention claimed is:

1. An insulated electric wire formed by covering a rectangular conductor wire having a rectangular cross-sectional shape with an insulating film,
wherein the insulating film is formed of an inner layer covering a surface of the rectangular conductor wire, and an outer layer covering a surface of the inner layer,
a thickness $t_1$ of a section of the inner layer, which covers one short side of two facing short sides of the same length of a rectangular cross section of the rectangular conductor wire, is greater than a thickness $t_2$, which includes that $t_2=0$, of a section of the inner layer which covers the other short side,
an elastic modulus of the inner layer is less than an elastic modulus of the outer layer, or a yield stress of the inner layer is less than a yield stress of the outer layer, or both of the elastic modulus and the yield stress of the inner layer are less than the elastic modulus and the yield stress of the outer layer, and
a ratio $t_1/t_3$ of the thickness $t_1$ of the section of the inner layer, which covers the one short side, to a thickness $t_3$ of a section of the outer layer, which covers the one short side via the inner layer, is in a range of 0.15 to 0.35.

2. The insulated electric wire according to claim 1, wherein the insulating film formed of the inner layer and the outer layer has a thickness of 40 to 65 μm.

3. The insulated electric wire according to claim 2, wherein a long side/short side ratio of a length of a long side to that of the short sides in the rectangular cross section of the rectangular conductor wire is in a range of 4 to 50, and
an equivalent round wire diameter of the rectangular conductor wire is in a range of 3 to 5 mm.

4. The insulated electric wire according to claim 2, wherein the rectangular conductor wire is a copper wire,
a material of the inner layer is a polyimide resin or a polyamide-imide resin which has a urethane backbone or a siloxane backbone, and
a material of the outer layer is a polyimide resin or a polyamide-imide resin.

5. A coil production method, wherein a coil is produced by winding the insulated electric wire according to claim 2 using edgewise bending in which the insulated electric wire is bent in a state where the one short side covered with the thick section of the inner layer is located inside.

6. A coil, wherein the coil is wound multiple turns in an edgewise manner in which the insulated electric wire according to claim 2 is bent in a state where the one short side covered with the thick section of the inner layer is located inside.

7. The insulated electric wire according to claim 1,
wherein a long side/short side ratio of a length of a long side to that of the short sides in the rectangular cross section of the rectangular conductor wire is in a range of 4 to 50, and
an equivalent round wire diameter of the rectangular conductor wire is in a range of 3 to 5 mm.

8. The insulated electric wire according to claim 7,
wherein the rectangular conductor wire is a copper wire,
a material of the inner layer is a polyimide resin or a polyamide-imide resin which has a urethane backbone or a siloxane backbone, and
a material of the outer layer is a polyimide resin or a polyamide-imide resin.

9. A coil production method, wherein a coil is produced by winding the insulated electric wire according to claim 7 using edgewise bending in which the insulated electric wire is bent in a state where the one short side covered with the thick section of the inner layer is located inside.

10. The insulated electric wire according to claim 1,
wherein the rectangular conductor wire is a copper wire,
a material of the inner layer is a polyimide resin or a polyamide-imide resin which has a urethane backbone or a siloxane backbone, and
a material of the outer layer is a polyimide resin or a polyamide-imide resin.

11. A coil production method, wherein a coil is produced by winding the insulated electric wire according to claim 1 using edgewise bending in which the insulated electric wire is bent in a state where the one short side covered with the thick section of the inner layer is located inside.

12. A coil, wherein the coil is wound multiple turns in an edgewise manner in which the insulated electric wire according to claim 1 is bent in a state where the one short side covered with the thick section of the inner layer is located inside.

* * * * *